United States Patent
Bubb et al.

(10) Patent No.: US 6,296,114 B1
(45) Date of Patent: Oct. 2, 2001

(54) PACKAGE FOR OPTICAL DISK STACK

(75) Inventors: Wayne A. Bubb, Fairport; Mark T. Veness, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/578,384

(22) Filed: May 25, 2000

(51) Int. Cl.$^7$ .................................................. B65D 85/57
(52) U.S. Cl. ........................ 206/308.1; 206/310; 206/445
(58) Field of Search .................................. 206/303, 307, 206/308.1, 308.3, 309, 310, 445; 360/133; 369/289, 290, 291

(56) References Cited

U.S. PATENT DOCUMENTS

| | | | |
|---|---|---|---|
| 4,577,756 | * | 3/1986 | Hennessy et al. .................... 206/310 |
| 6,112,894 | * | 9/2000 | Kikuchi et al. .................... 206/308.1 |
| 6,119,872 | * | 9/2000 | Flores, Jr. et al. .................... 206/310 |

FOREIGN PATENT DOCUMENTS

| | | | |
|---|---|---|---|
| 3-148486 | * | 6/1991 | (JP) . |
| 4-352682 | * | 12/1992 | (JP) . |
| 2000-255672 | * | 9/2000 | (JP) . |

* cited by examiner

*Primary Examiner*—Jim Foster
(74) *Attorney, Agent, or Firm*—Raymond L. Owens (57) ABSTRACT

A package for a stack of optical disks has two spaced apart endcaps, each endcap defining a central protrusion portion, a middle portion, and a lip portion. A plurality of ribs extends radially outwardly from the protrusion portion through the middle portion and terminates at the lip portion. A central portion of each end disk of the stack is engaged with the central protrusion portion of a corresponding endcap. The lip portion surrounds at least one optical disk at each end of the stack. The stack is retained between the endcaps in a package by a wrapping material mounted about the stack and extending to portions of exterior surfaces of the endcaps. In a second embodiment the package includes a spindle member.

22 Claims, 8 Drawing Sheets

PACKAGE FOR OPTICAL DISK STACK

FIELD OF THE INVENTION

The present invention relates to a package for a plurality of optical disks which form a stack.

BACKGROUND OF THE INVENTION

Bulk packaging of optical disks, such as, for example conventional compact disks (CDs), compact read-only memory optical disks (CD-ROMs), and hybrid optical disks having recorded and recordable portions, is rapidly evolving as a technology driven by economic considerations since packaging costs can constitute a measurable fraction of the manufacturing costs of optical disks.

Various designs of packages for a stack of optical disks have been proposed or are commercially available. One design includes a base and a spindle extending from the base wherein the base and spindle are molded as an integral unit. An upper portion of the spindle is threaded to mate with a nut which serves to affix a top plate and a plastic container for covering a stack of disks. A spacer is used over the spindle if a reduced number of disks are packaged as a stack.

Another bulk packaging system for a stack of disks is commercially available from El Mar Plastics, Inc., of Carson, Calif., under the designation "CD Shipping Spindles." This packaging system includes two endcaps, each of which has a central protrusion portion formed on a planar surface thereof. An opposing surface has a plurality of ribs extending radially outwardly from an inner rim to an outer rim. Each endcap has a centered twist lock recess for accepting a twist lock spindle. A stack of disks is disposed along the spindle between the protrusion portions of the endcaps, and a plastic shield extends between the outer rims of the endcaps to protect the stack of disks and to provide structural integrity to the package.

SUMMARY OF THE INVENTION

It is an object of the present invention to provide a package for a stack of optical disks in which the package includes two endcaps having lip portions to surround an outer edge of at least one optical disk at each one of opposite ends of the stack.

It is another object of the present invention to provide a package for a stack of optical disks in which the package includes two endcaps having lip portions to surround an outer edge of at least one optical disk at each one of opposite ends of the stack, and a spindle member extending between the endcaps for accepting a stack of optical disks.

It is a further object of the present invention to provide a package for a stack of optical disks in which the package includes two endcaps having lip portions to surround an outer edge of at least one optical disk at each one of opposite ends of the stack, and a wrapping material mounted about exterior portions of the endcaps and extending along outer edges of the disks of the stack which are not surrounded by the lip portions so as to secure the stack of optical disks between the endcaps.

In one aspect, these and other objects and advantages are achieved in a package for a plurality of optical disks which form a stack wherein each disk includes a nonrecorded or a nonwritable portion surrounding a center hole formed in the disk, comprising:

a) first and second spaced apart endcaps, each such endcap defining a protrusion portion which engages the nonrecorded or the nonwritable portion of a disk disposed at one of opposite ends of the stack;

b) each endcap further defining a middle portion which extends outwardly from the protrusion portion and terminates in a lip portion which extends from the middle portion to spacedly surround an outer edge of at least one optical disk at one of the opposite ends of the stack; and c) a wrapping material mounted about exterior portions of the endcaps and extending along outer edges of the disks of the stack not surrounded by the lip portions to secure the stack of optical disks between the first and second endcaps.

In another aspect, these and other objects and advantages are achieved in a package for a plurality of optical disks which form a stack wherein each disk includes a nonrecorded or a nonwritable portion surrounding a center hole formed in the disk, comprising:

a) first and second spaced apart endcaps, at least one of such endcaps defining a protrusion portion which engages the nonrecorded or the nonwritable portion of a disk disposed at one of opposite ends of the stack, and each endcap having an endcap center hole of a diameter substantially identical to a diameter of the center hole formed in the disks;

b) each endcap further defining a middle portion which extends outwardly from the protrusion portion and terminates in a lip portion which extends from the middle portion to spacedly surround an outer edge of at least one optical disk at one of the opposite ends of the stack;

c) a spindle member inserted into an endcap center hole of one of the endcaps and extending upwardly through the center hole of each optical disk in the stack and terminating in the endcap center hole of the second endcap; and d) a wrapping material mounted about exterior portions of the endcaps and extending along outer edges of the disks of the stack not surrounded by the lip portions to secure the stack of optical disks between the first and second endcaps.

DETAILED DESCRIPTION OF THE INVENTION

Figure 1:
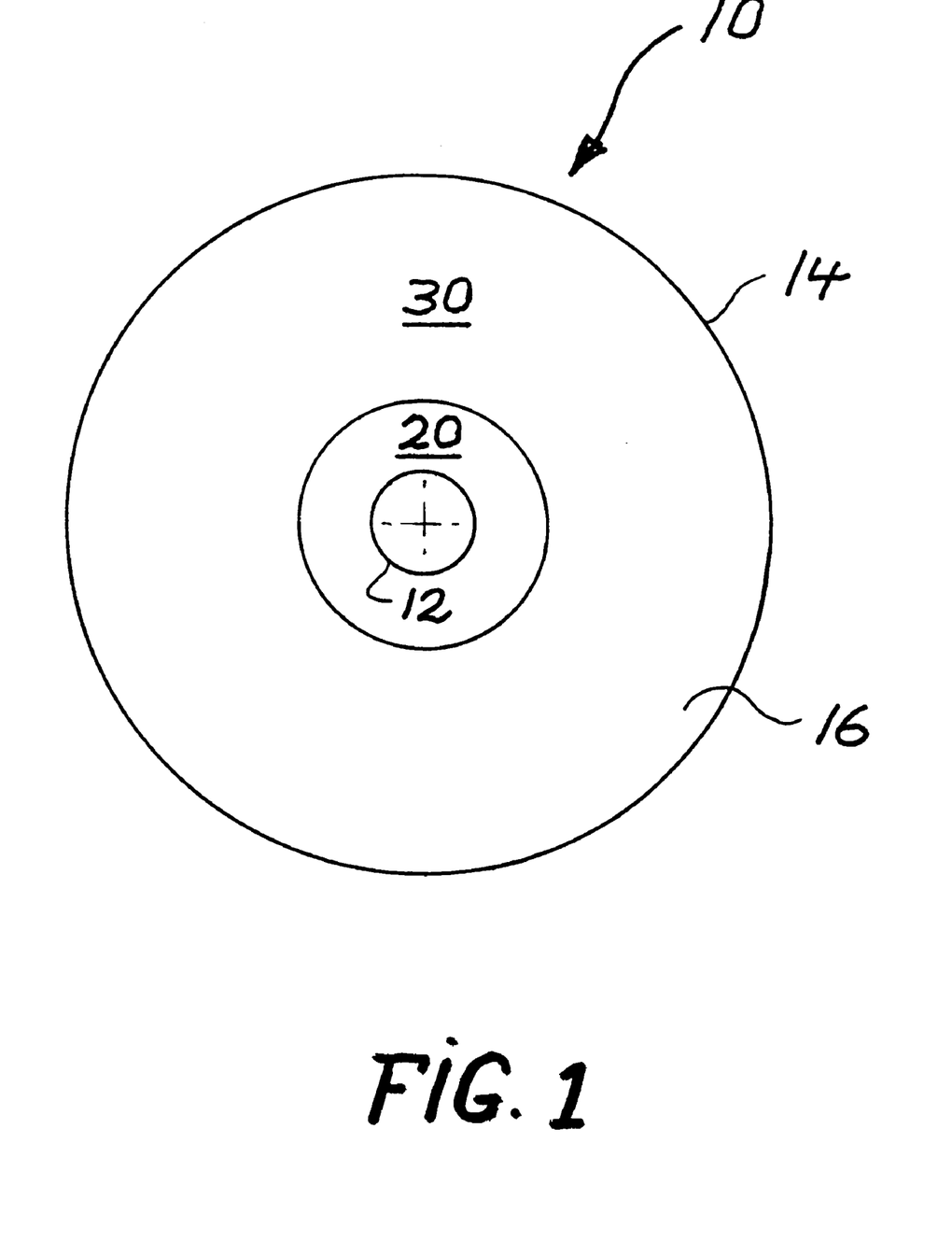
FIG. 1 is a schematic plan view of an optical disk having a nonrecorded/nonwritable portion and a recorded/writable portion.

FIG. 1 is a schematic plan view of an optical disk 10 which has a center hole 12, an outer edge 14, and a peripheral disk surface 16. The disk 10 includes a nonrecorded or a nonwritable portion 20 surrounding the center hole 12, and a recorded or a writable portion 30.

Figure 2:
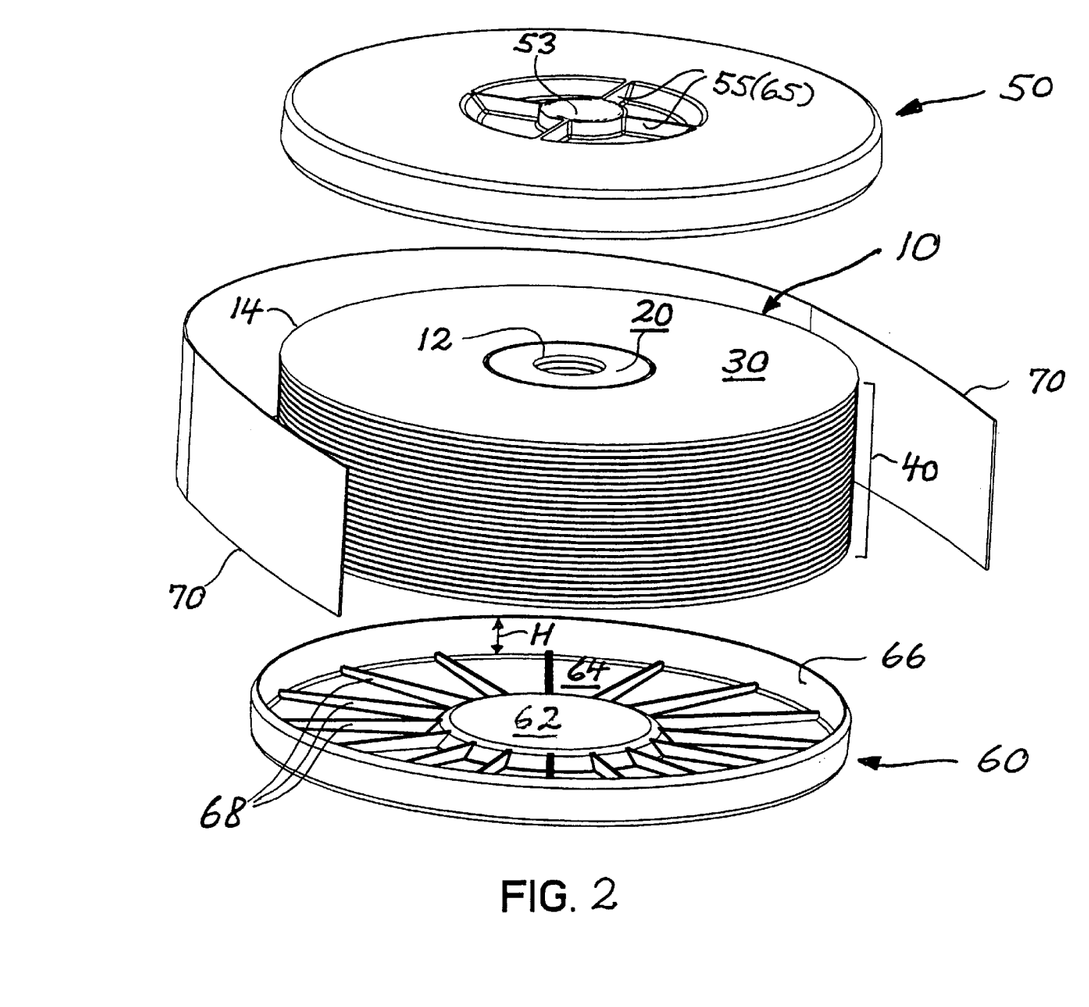
FIG. 2 is an exploded perspective view of parts of a first embodiment of a package for a stack of optical disks in accordance with the present invention.

FIG. 2 is an exploded perspective view of parts of a first embodiment of a package for a plurality of optical disks 10 forming a stack 40 which is to be packaged between a lower endcap 60 and an upper endcap 50. A band 70 will surround the stack 40 in a final package, and will extend into the lip portion 66 of the endcap 60 as well as into a corresponding lip portion 56 of the endcap 50.

The endcap 60 (as well as the endcap 50, see FIG. 3) defines a protrusion portion 62 (52) which engages the nonrecorded or the nonwritable portion 20 of a disk 10 disposed at one of opposite ends of the stack 40. A middle portion 64 (54) extends outwardly from the protrusion portion 62 (52) and terminates in a lip portion 66 (56) which extends from the middle portion 64 to spacedly surround an outer edge 14 of at least one optical disk 10 at each of the opposite ends of the stack, as governed by a height dimension H of the lip portion 66 (56).

Figure 3:
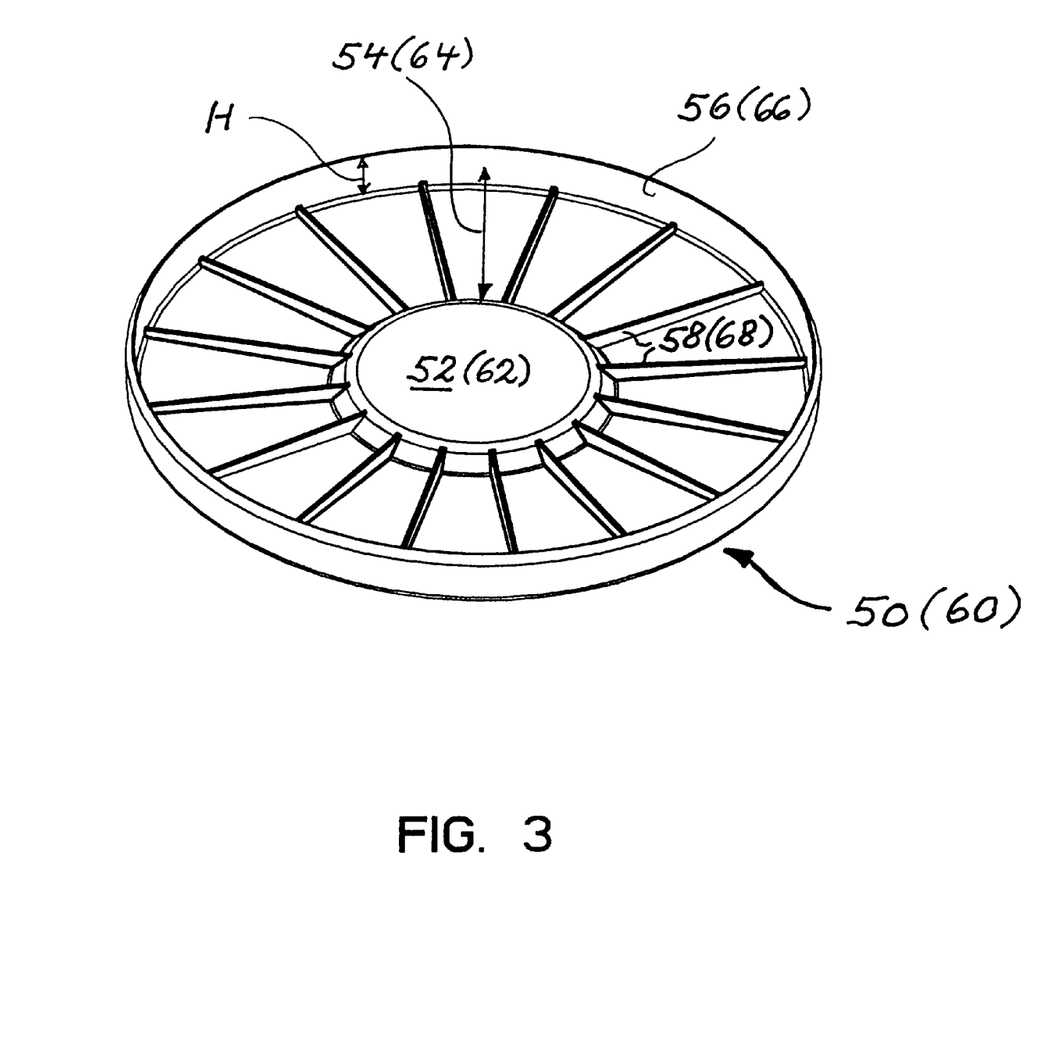
FIG. 3 is a perspective view of an inside surface of an endcap of the first embodiment in accordance with the present invention.

A plurality of ribs 68 (58) extend outwardly from the protrusion portion 62 (52) through the middle portion 64 (54) and terminate in the lip portion 66 (56). The ribs 68 (58) are sloped downwardly in a direction from the protrusion portion 62 (52) through the middle portion 64 (54) to the lip portion 66 (56).

On an exterior surface of the endcap 50 (60) a plurality of ribs 55 (65) extend radially between a central cap region 53 through the indented exterior surface of the protrusion portions.

FIG. 3 is a perspective view of an inside surface of an endcap 50 (60) of the embodiment described with reference to FIG. 2, and is intended to indicate the features common to the endcaps 50 and 60.

Figure 4:
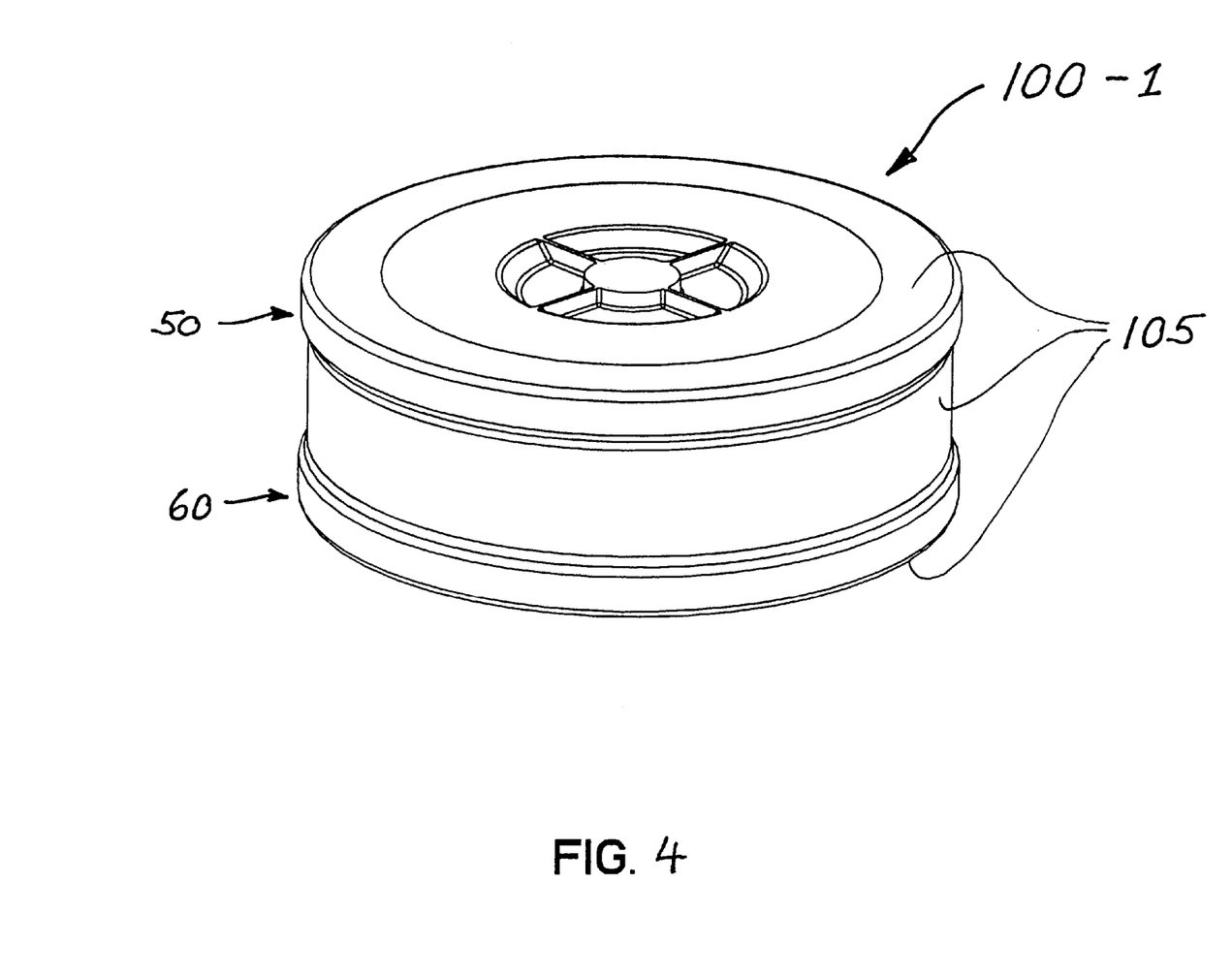
FIG. 4 is a perspective view of a first embodiment of a package for a stack of optical disks in accordance with the present invention in which a wrapping material encases portions of the endcaps and the edges of the optical disks in the stack.

FIG. 4 is a perspective view of a first embodiment of a completed package 100-1 for a stack of optical disks which are retained between the endcaps 50 and 60 firstly by the band 70, and secondly by a wrapping material 105 which is mounted about exterior portions of the endcaps and which extends along outer edges 14 of the disks of the stack 40 which are not surrounded by the lip portions 56 (66) so as to secure the stack of optical disks between the endcaps. The band 70 can include visually discernible information, such as, for example, text, logos, images, or other indicia which would be visible through the wrapping material 105.

The endcaps 50, 60 are made of a molded plastic material, which, due to the interior ribs 58 (68) and the exterior ribs 55 (65), can flex when the wrapping material 105 is mounted about the exterior portions of the endcaps without causing contact between the middle portions 54 (64) of the endcaps and the disks engaged by the protrusion portions 52 (62) of the endcaps. Contact is also avoided between the lip portions 56 (66) of the endcaps and the disks engaged by the protrusion portions 52 (62) of the endcaps. Thus, flexing of the endcaps 50 (60) induced by forces exerted on the endcaps by the wrapping materials are, at least in part, directed towards the protrusion portions 52 (62) thereby preventing warping of the peripheral disk surfaces 16 (see FIG. 1).

Figure 5:
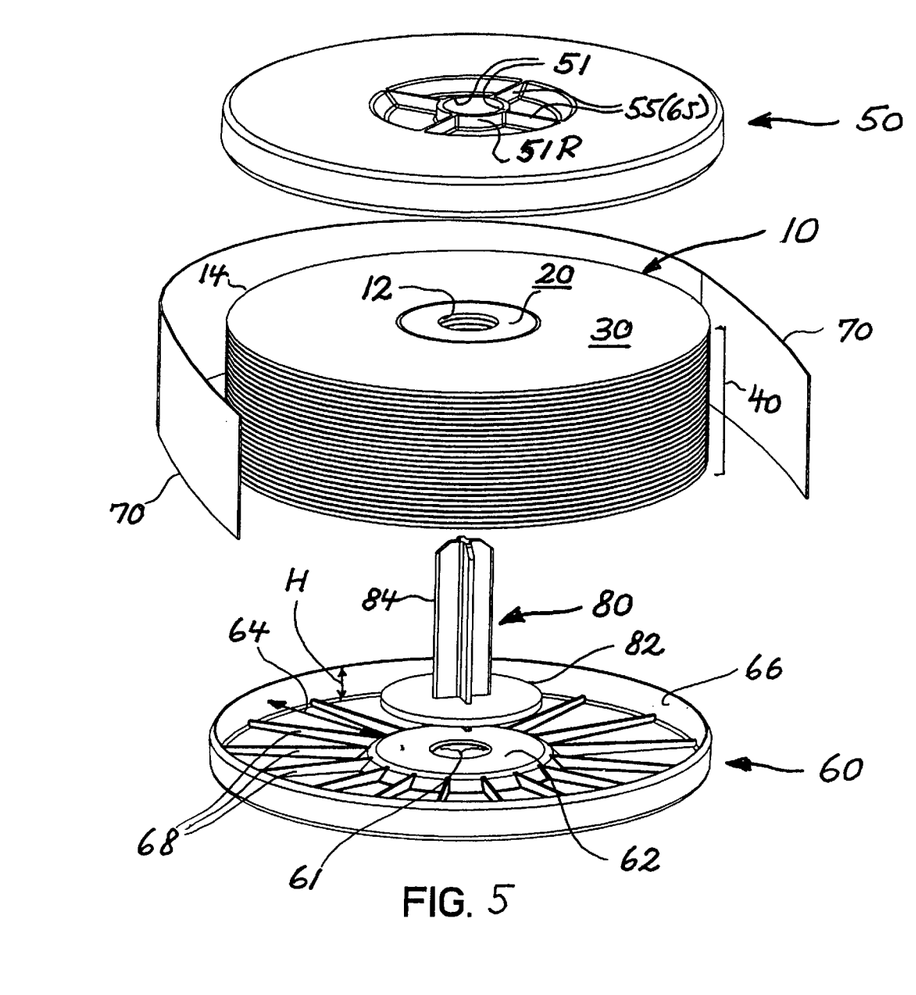
FIG. 5 is an exploded perspective view of parts of a second embodiment of a package for a stack of optical disks which includes a spindle member in accordance with present invention.

Turning to FIG. 5, there is depicted an exploded perspective view of parts of a second embodiment of a package for a stack of optical disks which includes a spindle member 80 as a distinguishing feature of this embodiment over the embodiment described above. Parts or elements common to both package embodiments are shown with like numeral designations. Accordingly, a detailed description of such common parts or their function will not be required.

An endcap center hole 51 in the endcap 50, and an endcap center hole 61 in the endcap 60 is formed in the center of corresponding protrusion portions 62 (52), the endcap center holes having a diameter which is substantially identical to a diameter of the center hole 12 formed in the disks 10 of the stack 40.

The spindle member 80 has a flange 82 from which an insertion stub 86 extends downwardly (see FIG. 6) for insertion into the endcap center hole 61 of the endcap 60. The spindle 84 extends upwardly for accepting the stack 40 of optical disks and for engaging the endcap center hole 51 in the endcap 50. The flange 82 defines a protrusion portion which is disposed over the protrusion portion 62 of the endcap 60.

A plurality of ribs 55 (65) extend radially between an endcap center hole rim 51R (61R) through the indented exterior surface of the protrusion portions.

Figure 6:
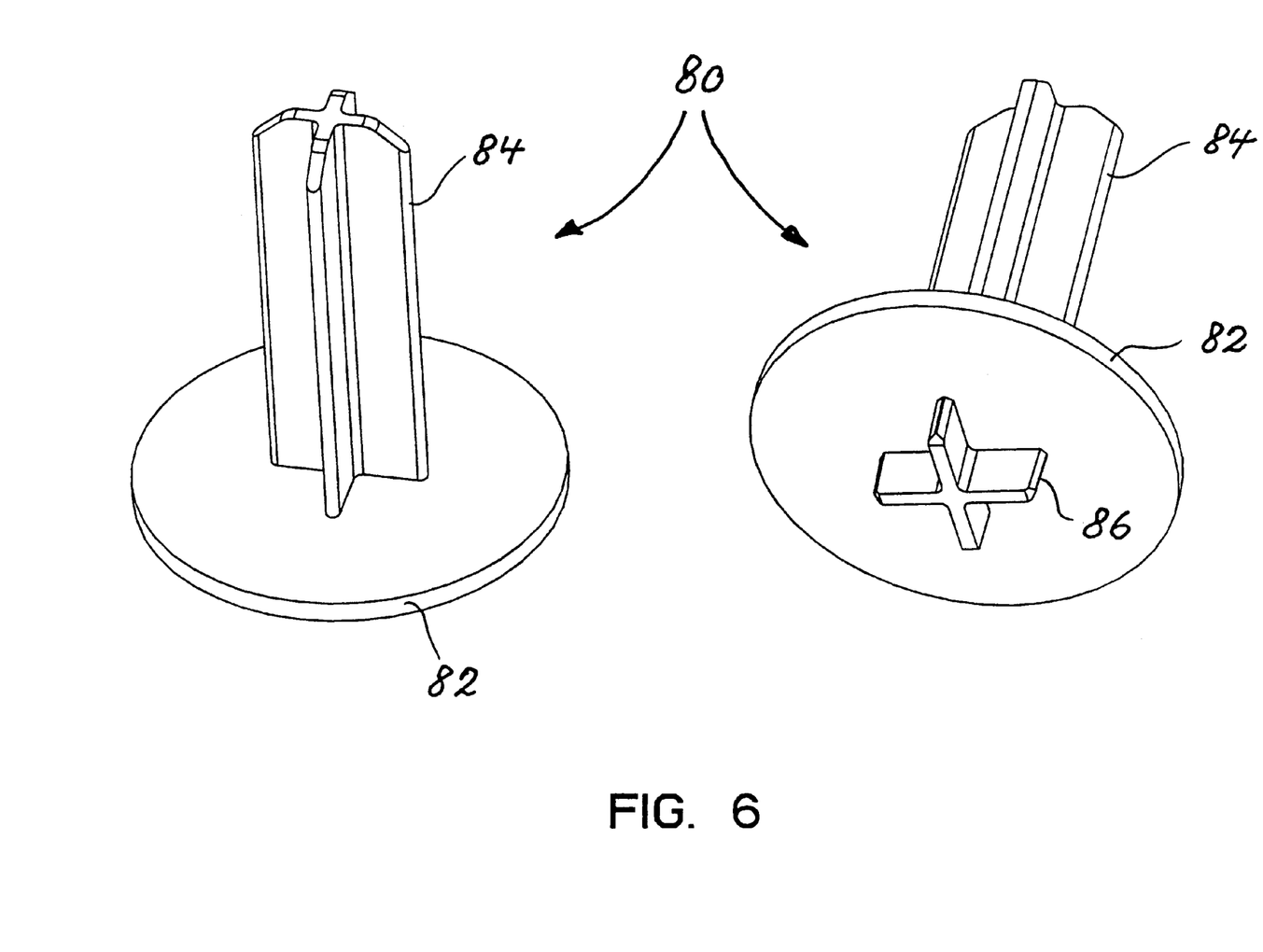
FIG. 6 shows perspective top and bottom views of the spindle member.

FIG. 6 shows perspective top and bottom views of the spindle member 80 having the insertion stub 86 extending downwardly from the flange 82, and the spindle 84 extending upwardly from the flange 82, as described previously.

Figure 7:
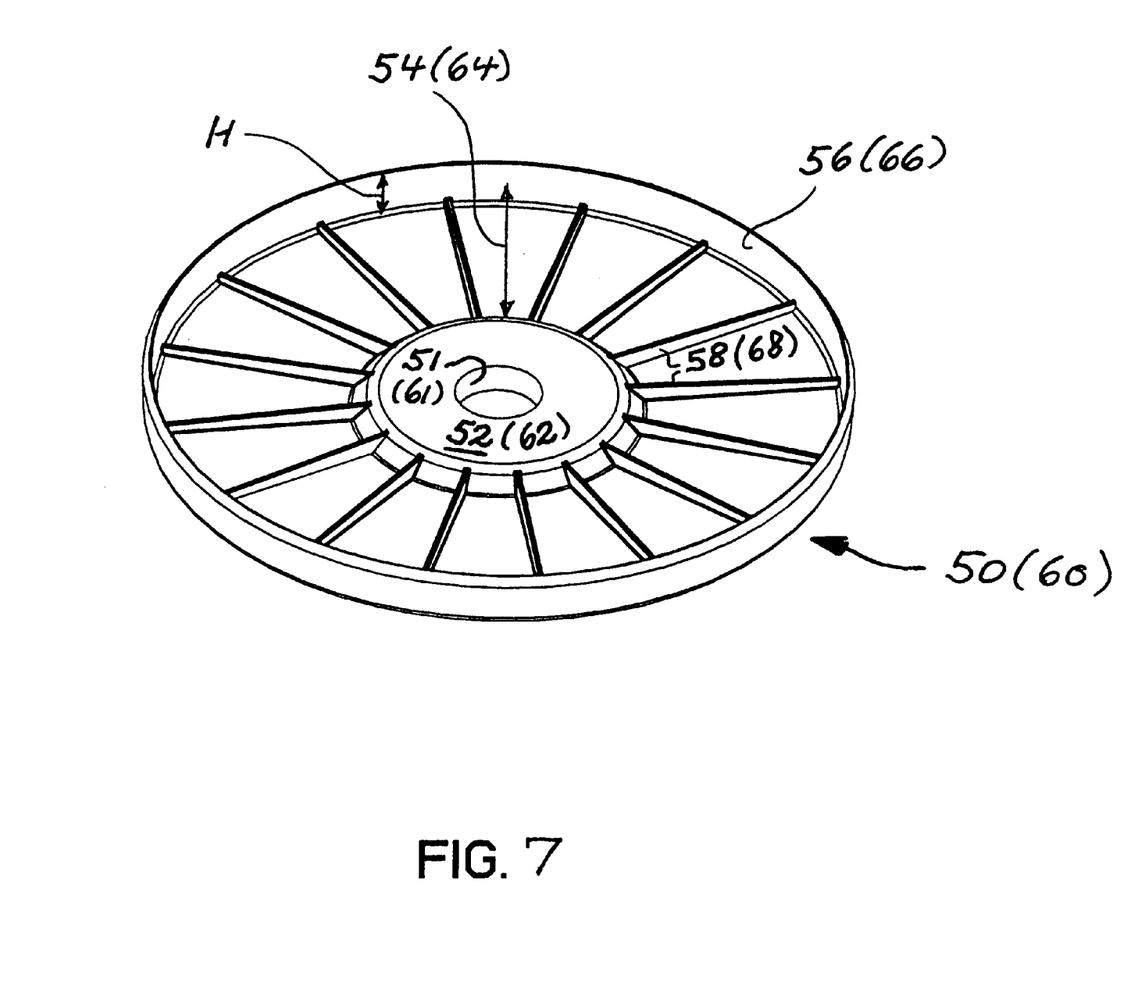
FIG. 7 is a perspective view of an inside surface of an endcap of the second embodiment in accordance with the present invention.

FIG. 7 is a perspective view of an inside surface of an endcap 50 (60) which shows the endcap center hole 51 (61) for accepting the spindle member 80.

Figure 8:
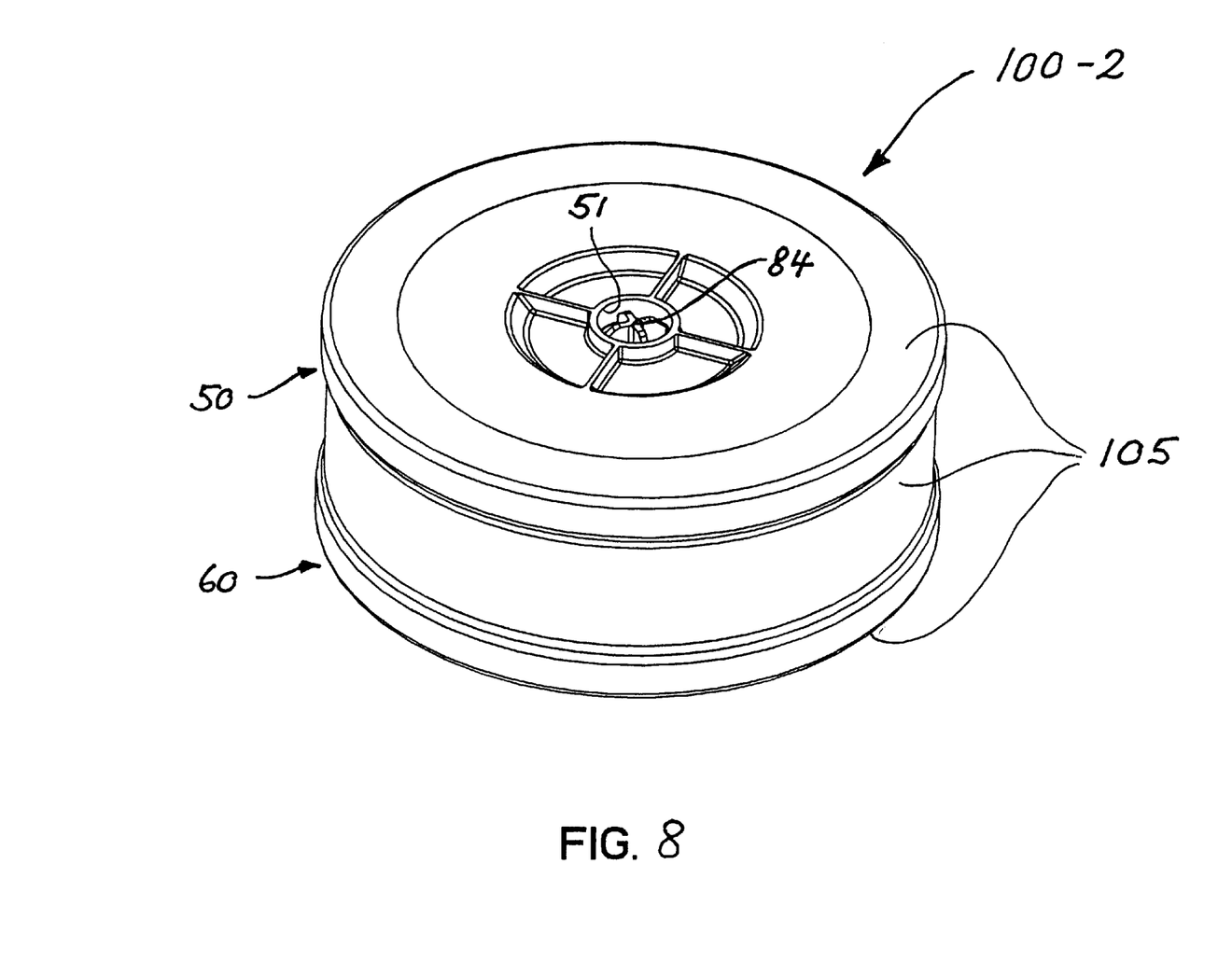
FIG. 8 is a perspective view of a second embodiment of a package for a stack of optical disks in accordance with the present invention in which a wrapping material encases portions of the endcaps and the edges of the optical disks in the stack.

FIG. 8 is a perspective view of the second embodiment of a package 100-2 for a stack of optical disks which are retained between endcaps 50, 60 by the aforementioned wrapping material 105. The spindle 84 of the spindle member 80 is seen projected into the endcap center hole 51.

The invention has been described in detail with particular reference to certain preferred embodiments thereof, but it will be understood that variations and modifications can be effected within the spirit and scope of the invention.

PARTS LIST 10 optical disk
12 center hole
14 outer edge
16 peripheral disk surface
20 nonrecorded or nonwritable portion
30 recorded or writable portion
40 stack of optical disks
50 endcap
51 endcap center hole
51R endcap center hole rim
52 protrusion portion
53 central cap region
54 middle portion
55 ribs along exterior surface
56 lip portion
58 ribs
60 endcap
61 endcap center hole
61R endcap center hole rim
62 protrusion portion
64 middle portion
65 ribs along exterior surface
66 lip portion
68 ribs
70 band
80 spindle member
82 flange (defining a protrusion portion)
84 spindle

PARTS LIST (con't)

86 insertion stub
100-1 package (first embodiment)

100-2 package (second embodiment)
105 wrapping material
H height dimension of lip portion

What is claimed is:

1. A package for a plurality of optical disks which form a stack wherein each disk includes a nonrecorded or a nonwritable portion surrounding a center hole formed in the disk, comprising:

a) first and second spaced apart endcaps, each such endcap defining a protrusion portion which engages the nonrecorded or the nonwritable portion of a disk disposed at one of opposite ends of the stack;

b) each endcap further defining a middle portion which extends outwardly from the protrusion portion and terminates in a lip portion which extends from the middle portion to spacedly surround an outer edge of at least one optical disk at one of the opposite ends of the stack; and c) a wrapping material mounted about exterior portions of the endcaps and extending along outer edges of the disks of the stack not surrounded by the lip portions to secure the stack of optical disks between the first and second endcaps.

2. The package of claim 1 wherein the first and second endcaps further include a plurality of ribs which extend radially outwardly from the protrusion portion through the middle portion and terminate in the lip portion.

3. The package of claim 1 wherein the first and second endcaps further include a plurality of ribs which extend radially between a central cap region through an indented feature of the protrusion portion along an exterior surface of the endcaps.

4. The package of claim 2 wherein the spaced apart endcaps are made of a molded plastic material which can flex when the wrapping material is mounted about the exterior portions of the endcaps without causing contact between the middle portion of the endcaps and the disks engaged by the protrusion portion of the endcaps.

5. The package of claim 2 wherein the spaced apart endcaps are made of a molded plastic material which can flex when the wrapping material is mounted about the exterior portions of the endcaps without causing contact between the lip portion of the endcaps and the disks engaged by the protrusion portion of the endcaps.

6. The package of claim 1 further including a band which is disposed between the stack and the lip portion of each endcap and extends between the spaced apart endcaps, the band being positioned prior to mounting the wrapping material about the exterior portions of the endcaps.

7. The package of claim 6 wherein the band includes visually perceivable information provided on a surface of the band which is in contact with the wrapping material.

8. The package of claim 1 wherein the lip portion has a lip height dimension selected to surround at least one optical disk.

9. A package for a plurality of optical disks which form a stack wherein each disk includes a nonrecorded or a nonwritable portion surrounding a center hole formed in the disk, comprising:

a) first and second spaced apart endcaps, at least one of such endcaps defining a protrusion portion which engages the nonrecorded or the nonwritable portion of a disk disposed at one of opposite ends of the stack, and each endcap having an endcap center hole of a diameter substantially identical to a diameter of the center hole formed in the disks;

b) each endcap further defining a middle portion which extends outwardly from the protrusion portion and terminates in a lip portion which extends from the middle portion to spacedly surround an outer edge of at least one optical disk at one of the opposite ends of the stack;

c) a spindle member inserted into an endcap center hole of one of the endcaps and extending upwardly through the center hole of each optical disk in the stack and terminating in the endcap center hole of the second endcap; and d) a wrapping material mounted about exterior portions of the endcaps and extending along outer edges of the disks of the stack not surrounded by the lip portions to secure the stack of optical disks between the first and second endcaps.

10. The package of claim 9 wherein the spindle member includes a flange from which an insertion stub extends downwardly for insertion into the endcap center hole of one of the endcaps and from which a spindle extends upwardly for accepting the stack of optical disks.

11. The package of claim 10 wherein the flange defines a protrusion portion which engages the nonrecorded or the nonwritable portion of a disk.

12. The package of claim 11 wherein the first and second endcaps further include a plurality of ribs which extend radially outwardly from the protrusion portion through the middle portion and terminate in the lip portion.

13. The package of claim 11 wherein the first and second endcaps further include a plurality of ribs which extend radially between an endcap center hole rim through the protrusion portion along an exterior surface of the endcaps.

14. The package of claim 11 wherein the spaced apart endcaps are made of a molded plastic material which can flex when the wrapping material is mounted about the exterior portions of the endcaps without causing contact between the middle portion of the endcaps and the disks engaged by the protrusion portion of the endcaps.

15. The package of claim 11 wherein the spaced apart endcaps are made of a molded plastic material which can flex when the wrapping material is mounted about the exterior portions of the endcaps without causing contact between the lip portion of the endcaps and the disks engaged by the protrusion portion of the endcaps.

16. The package of claim 11 further including a band which is disposed between the stack and the lip portion of each endcap and extends between the spaced apart endcaps, the band being positioned prior to mounting the wrapping material about the exterior portions of the endcaps.

17. The package of claim 9 wherein the spindle member is made of a molded plastic material.

18. The package of claim 9 further including a band which is disposed between the stack and the lip portion of each endcap and extends between the spaced apart endcaps, the band being positioned prior to mounting the wrapping material about the exterior portions of the endcaps.

19. The package of claim 18 wherein the band includes visually perceivable information provided on a surface of the band which is in contact with the wrapping material.

20. The package of claim 9 wherein the lip portion has a lip height dimension selected to surround at least one optical disk.

21. The package of claim 2 wherein the plurality of ribs are sloped downwardly in a direction from the protrusion portion through the middle portion and termination in the lip portion.

22. The package of claim 12 wherein the plurality of ribs are sloped downwardly in a direction from the protrusion portion through the middle portion and termination in the lip portion.

* * * * *